(12) United States Patent
Yamasaki et al.

(10) Patent No.: US 11,878,673 B2
(45) Date of Patent: Jan. 23, 2024

(54) ELECTROMAGNETIC VALVE AND BRAKE CONTROL DEVICE

(71) Applicant: Hitachi Automotive Systems, Ltd., Hitachinaka (JP)

(72) Inventors: Hiromasa Yamasaki, Atsugi (JP); Masaki Misuno, Atsugi (JP); Chiharu Nakazawa, Kawasaki (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 520 days.

(21) Appl. No.: 17/059,126

(22) PCT Filed: May 21, 2019

(86) PCT No.: PCT/JP2019/020091
§ 371 (c)(1),
(2) Date: Nov. 25, 2020

(87) PCT Pub. No.: WO2019/230498
PCT Pub. Date: Dec. 5, 2019

(65) Prior Publication Data
US 2021/0206360 A1 Jul. 8, 2021

(30) Foreign Application Priority Data
May 28, 2018 (JP) .................. 2018-101653

(51) Int. Cl.
*F16K 31/06* (2006.01)
*B60T 8/48* (2006.01)
(Continued)

(52) U.S. Cl.
CPC .......... *B60T 8/4872* (2013.01); *B60T 13/686* (2013.01); *B60T 7/042* (2013.01); *F16K 31/06* (2013.01)

(58) Field of Classification Search
CPC ...... B60T 8/3605; B60T 8/363; B60T 8/3655; B60T 13/686; B60T 8/4872; F16K 31/06; F16K 31/0675; H01F 2007/085
(Continued)

(56) References Cited

U.S. PATENT DOCUMENTS 4,643,359 A * 2/1987 Casey .................. F02M 61/168
239/585.4
4,919,390 A * 4/1990 Ichiryu .................. H01F 7/1607
335/297
(Continued)

FOREIGN PATENT DOCUMENTS

DE 4423122 A1 * 1/1996 ........... H01F 7/1607
JP 55-123067 A 9/1980
(Continued)

OTHER PUBLICATIONS

Machine translation of JP 2000-205432, retrieved May 6, 2023 (Year: 2023).*
(Continued)

Primary Examiner — Bradley T King
(74) Attorney, Agent, or Firm — Crowell & Moring LLP

(57) ABSTRACT

A cutoff valve comprises a coil wound around an outer periphery of a bobbin, a cylinder in contact with a protruding portion formed in an inner side of the bobbin, and an armature disposed inside the cylinder and moved in a winding axis direction of the coil by energization of the coil.

6 Claims, 11 Drawing Sheets

(51) Int. Cl.
   *B60T 13/68* (2006.01)
   *B60T 7/04* (2006.01)
(58) Field of Classification Search
   USPC .................................................. 303/119.2
   See application file for complete search history.

(56) References Cited

U.S. PATENT DOCUMENTS

| | | | | |
|---|---|---|---|---|
| 5,494,255 | A * | 2/1996 | Pearson | F02M 26/48 335/278 |
| 5,711,583 | A * | 1/1998 | Bareiss | B60T 8/4872 303/119.2 |
| 5,752,750 | A * | 5/1998 | Lubischer | B60T 8/5037 303/119.2 |
| 5,779,220 | A * | 7/1998 | Nehl | F02M 26/48 335/297 |
| 5,797,587 | A * | 8/1998 | Schumacher | F16K 31/0606 251/129.21 |
| 5,895,026 | A * | 4/1999 | Linkner, Jr. | B60T 8/3615 335/282 |
| 6,019,441 | A * | 2/2000 | Lloyd | B60T 8/36 303/157 |
| 6,501,359 | B2 * | 12/2002 | Matsusaka | H01F 7/1607 335/278 |
| 6,564,443 | B2 * | 5/2003 | Oishi | H01F 7/1607 335/260 |
| 7,246,863 | B2 * | 7/2007 | Otsuka | B60T 8/3675 303/119.2 |
| 8,081,053 | B2 * | 12/2011 | Yamagata | H01F 7/081 335/260 |
| 2008/0224805 | A1 * | 9/2008 | Becker | H01F 7/1607 335/277 |
| 2015/0158473 | A1 * | 6/2015 | Matsunaga | B60T 15/028 303/119.2 |
| 2016/0084336 | A1 * | 3/2016 | Tsunekawa | F16F 9/58 188/322.12 |
| 2017/0254437 | A1 * | 9/2017 | Pellmann | H01F 7/126 |
| 2017/0350528 | A1 * | 12/2017 | Fukunaga | F16K 31/0675 |
| 2018/0247749 | A1 * | 8/2018 | Schonlau | H01F 5/02 |
| 2019/0293148 | A1 * | 9/2019 | Yasukouchi | F16F 9/58 |
| 2020/0041025 | A1 * | 2/2020 | Murata | H01F 7/081 |
| 2020/0227189 | A1 * | 7/2020 | Schonlau | H01F 7/129 |
| 2020/0278045 | A1 * | 9/2020 | Nishimura | H01F 7/128 |
| 2023/0003310 | A1 * | 1/2023 | Buss | F16K 31/0613 |

FOREIGN PATENT DOCUMENTS

| | | |
|---|---|---|
| JP | 60-78110 U | 5/1985 |
| JP | 2000-205432 A | 7/2000 |
| JP | 2001-227666 A | 8/2001 |
| JP | 2011-38630 A | 2/2011 |

OTHER PUBLICATIONS

Machine translation of DE 4423122, retrieved May 6, 2023 (Year: 2023).*
International Search Report (PCT/ISA/210) issued in PCT Application No. PCT/JP2019/020091 dated Jun. 18, 2019 with English translation (nine (9) pages).
Japanese-language Written Opinion (PCT/ISA/237) issued in PCT Application No. PCT/JP2019/020091 dated Jun. 18, 2019 with English translation (16 pages).

* cited by examiner

ELECTROMAGNETIC VALVE AND BRAKE CONTROL DEVICE

TECHNICAL FIELD

The invention relates to an electromagnetic valve and a brake control device.

BACKGROUND ART

Patent Literature 1 discloses an electromagnetic valve comprising a bobbin around which a coil is wound, a sleeve disposed inside the bobbin, and a plunger disposed inside the sleeve and moved by energization of the coil.

CITATION LIST

Patent Literature

PTL 1: Japanese Unexamined Patent Application Publication (Kokai) No. 2011-38630

SUMMARY OF INVENTION

Technical Problem

Regarding the aforementioned conventional electromagnetic valve, there have been demands for improvement in heat dissipation of the coil.

Solution to Problem

An object of the invention is to provide an electromagnetic valve and a brake control device, in which heat dissipation of a coil is improved.

An electromagnetic valve according to one embodiment of the invention includes a bobbin whose inner side is in contact with a cylindrical member.

The heat dissipation of the coil is thus improved in the electromagnetic valve according to the one embodiment of the invention.

DESCRIPTION OF EMBODIMENTS

Embodiment 1

Figure 1:
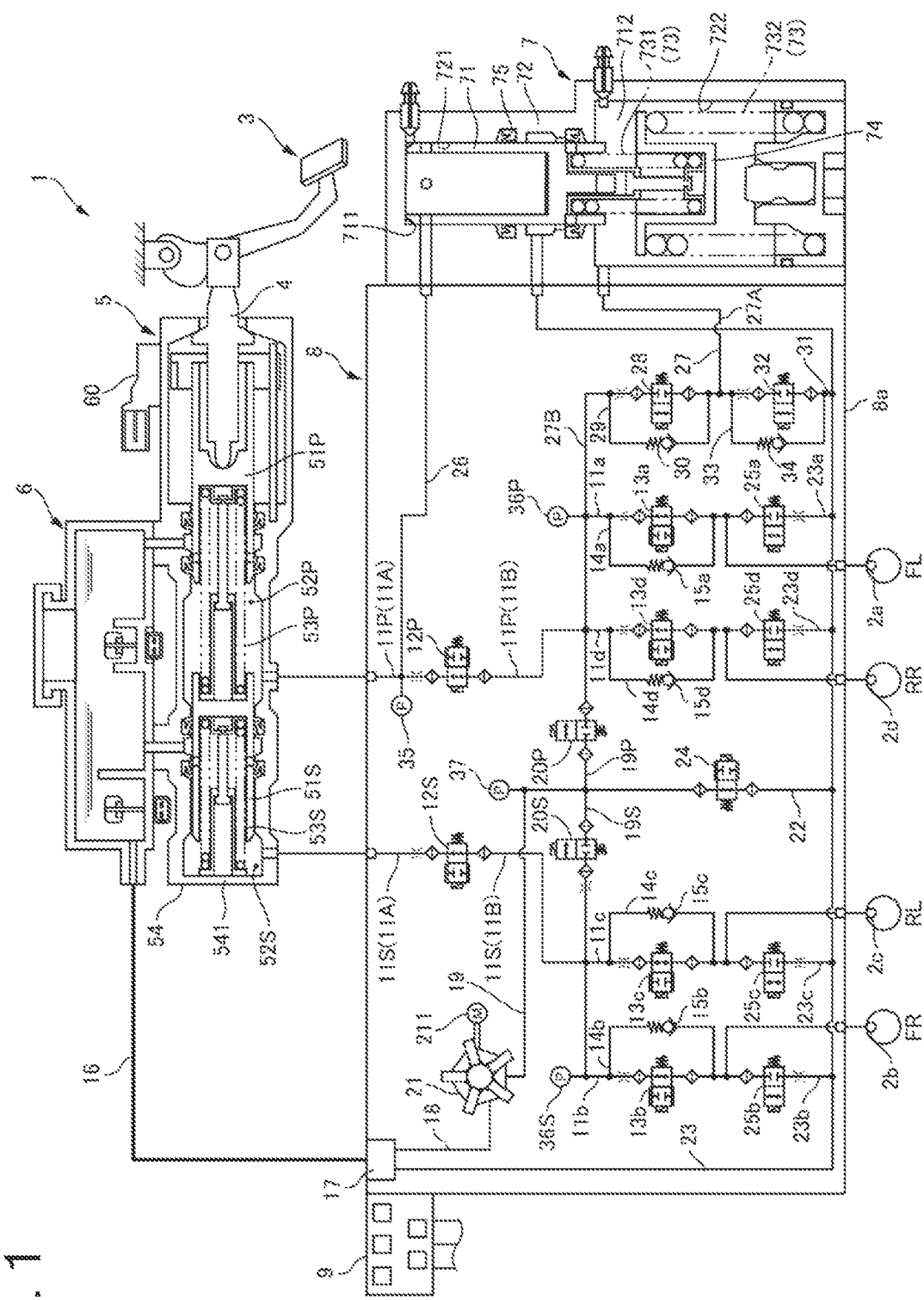
FIG. 1 is a configuration diagram of a brake control device 1 according to an Embodiment 1.

FIG. 1 is a configuration diagram of a brake control device 1 according to an Embodiment 1.

The brake control device 1 is installed in a common vehicle provided with only an internal combustion engine (engine) as an engine for driving wheels, a hybrid vehicle provided with an electric motor (generator) as well as an internal combustion engine, an electric vehicle provided with only an electric motor, or another like vehicle. The brake control device 1 is placed in each wheel (left front wheel FL, right front wheel FR, left rear wheel RL, right rear wheel RR). The brake control device 1 includes a disc brake that is actuated according to hydraulic pressure of a wheel cylinder (braking force imparting portion) 2. The brake control device 1 adjusts the hydraulic pressure of the wheel cylinder 2 to impart a braking force to each of the wheels FL, FR, RL and RR. The brake control device 1 includes dual-system (primary P- and secondary S-systems) brake piping. The brake piping is of, for example, an X-type. When differentiation is necessary between members corresponding to the primary system (hereinafter, referred to as P-system) on one side and members corresponding to the secondary system (hereinafter, referred to as S-system), reference marks representing the members are subscripted with a "P" or an "S" at the end thereof. When differentiation is necessary among members corresponding to the wheels FL, FR, RL and RR, reference marks representing the members are subscripted with "a", "b", "c" or "d".

A brake pedal 3 is a brake operating member that receives input of brake application by a driver. A pushrod 4 strokes according to operation of the brake pedal 3. A master cylinder 5 is actuated according to stroke amount of the pushrod 4 and generates hydraulic brake pressure (master cylinder hydraulic pressure).

The master cylinder 5 is supplied with brake fluid from a reservoir tank 6 that stores brake fluid. The master cylinder 5 is of a tandem type and includes a primary piston 51P and a secondary piston 51S which stroke according to the strokes of the pushrod 4. The pistons 51P and 51S are arranged in tandem along an axial direction of the pushrod 4. The primary piston 51P is connected to the pushrod 4. The secondary piston 51S is of a free-piston type. A stroke sensor 60 is mounted on the master cylinder 5. The stroke sensor 60 detects a stroke amount of the primary piston 51P as a pedal stroke amount of the brake pedal 3.

A stroke simulator 7 is actuated according to the brake application by the driver. The stroke simulator 7 generates pedal strokes by inflow of the brake fluid that flows out from the master cylinder 5 according to the brake application by the driver. The stroke simulator 7 includes a piston 71 that is axially actuated within a cylinder 72 against a biasing force of a spring 73 by the brake fluid supplied from the master cylinder 5. The stroke simulator 7 thus creates an operation reaction force according to the brake application by the driver.

A hydraulic unit 8 is capable of imparting a braking force to each of the wheels FL, FR, RL and RR independently of the brake application by the driver. The hydraulic unit 8 receives brake fluid supply from the master cylinder 5 and the reservoir tank 6. The hydraulic unit 8 is placed between the master cylinder 5 on one side and the wheel cylinders 2 on the other. The hydraulic unit 8 includes a motor 211 of a pump (hydraulic pressure source) 21 and a plurality of electromagnetic valves (cutoff valves 12 and the like) as actuators for generating control hydraulic pressure. The pump 21 sucks in the brake fluid from the reservoir tank 6 and discharges the brake fluid toward the wheel cylinders 2. The pump 21 is, for example, a plunger pump. The motor 211 is, for example, a brushed motor. The cutoff valves 12 and the like are opened/closed according to control signals and thus switch between communication states of fluid channels 11 and other channels, to thereby control the flow of the brake fluid. The hydraulic unit 8 pressurizes the wheel cylinders 2 with the hydraulic brake pressure generated by the pump while the master cylinder 5 and the wheel cylinders 2 are out of communication. The hydraulic unit 8 includes hydraulic pressure sensors 35, 36 and 37 that detect hydraulic pressures at different positions in the hydraulic unit 8.

A control unit 9 controls the actuation of the hydraulic unit 8. Detected values and information (wheel speed and other information) are inputted into the control unit 9. The detected values are the values transmitted from the stroke sensor 60 and the hydraulic sensors 35, 36 and 37. The information (wheel speed and other information) relates to a driving state transmitted from a vehicle side. Based on the inputted information of various kinds, the control unit 9 carries out information processing according to an internally stored program and computes target wheel cylinder hydraulic pressures of the wheel cylinders 2. The control unit 9 outputs a command signal to each of the actuators in the hydraulic unit 8 so that wheel cylinder hydraulic pressures of the wheel cylinders 2 become the target wheel cylinder hydraulic pressures. This enables various kinds of brake controls (boost control, antilock control, brake control for vehicle motion control, automatic brake controls, regenerative cooperative brake control, and other controls). The boost control generates the hydraulic brake pressure that is insufficiently generated by the driver's pedal effort, to thereby assist the brake application. The antilock control restrains a brake slip (locking tendency) of each of the wheels FL, FR, RL and RR. The vehicle motion control is vehicle behavior stabilization control that prevents skidding and the like. The automatic brake controls include preceding vehicle follow-up control, automatic emergency brake, and the like. The regenerative cooperative brake control controls wheel cylinder hydraulic pressure in cooperation with regenerative brake to achieve target deceleration.

The pistons 51P and 51S of the master cylinder 5 are contained in a cylinder 54. A primary hydraulic pressure chamber 52P is defined between the pistons 51P and 51S of the master cylinder 5. A compression coil spring 53P is placed in the primary hydraulic pressure chamber 52P. A secondary hydraulic pressure chamber 52S is defined between the secondary piston 51S and a bottom portion 541 of the cylinder 54. A compression coil spring 53S is placed in the secondary hydraulic pressure chamber 52S. The fluid channel (connecting fluid channel) 11 opens into the hydraulic pressure chambers 52P and 52S. The hydraulic pressure chambers 52P and 52S are connected to the hydraulic unit 8 through the fluid channels 11 and allowed to communicate with the wheel cylinders 2.

The pistons 51 stroke in response to depression of the brake pedal 3 by the driver, and master cylinder hydraulic pressures are generated according to decrease in volume of the hydraulic pressure chambers 52. The master cylinder hydraulic pressures generated in the hydraulic pressure chambers 52P and 52S are substantially equal. This causes the brake fluid to be supplied from the hydraulic pressure chambers 52 toward the wheel cylinders 2 through the fluid channels 11. The master cylinder 5 pressurizes wheel cylinders 2a and 2d of the P-system through the fluid channel (fluid channel 11P) of the P-system with the master cylinder hydraulic pressure generated in the primary hydraulic pressure chamber 52P. The master cylinder 5 pressurizes wheel cylinders 2b and 2c of the S-system through the fluid channel (fluid channel 11S) of the S-system with the master cylinder hydraulic pressure generated in the secondary hydraulic pressure chamber 52S.

The stroke simulator 7 includes the cylinder 72, the piston 71, and the spring 73. The cylinder 72 includes a cylindrical inner peripheral surface. The cylinder 72 includes a piston containing portion 721 and a spring containing portion 722. The piston containing portion 721 is smaller in diameter than the spring containing portion 722. A fluid channel 27 mentioned later always opens in an inner peripheral surface of the spring containing portion 722. The piston 71 is axially movable within the piston containing portion 721. The piston 71 separates an interior space of the cylinder 72 into a positive pressure chamber 711 and a back pressure chamber 712. A fluid channel 26 always opens into the positive pressure chamber 711. A fluid channel 27 always opens into the back pressure chamber 712. A piston seal 75 is placed at an outer periphery of the piston 71. The piston seal 75 comes into sliding contact with an inner peripheral surface of the piston containing portion 721 to seal a gap between the inner peripheral surface of the piston containing portion 721 and an outer peripheral surface of the piston 71. The piston seal 75 is a separation seal member that seals the gap between the positive pressure chamber 711 and the back pressure chamber 712, to thereby separate the positive pressure chamber 711 and the back pressure chamber 712 from each other in a liquid-tight manner. The piston seal 75 thus complements a function of the piston 71. The spring 73 is a compression coil spring that is placed in the back pressure chamber 712. The spring 73 biases the piston 71 from the back pressure chamber 712 side toward the positive pressure chamber 711 side. The spring 73 generates a reaction force according to compression amount. The spring 73 includes a first spring 731 and a second spring 732. The first spring 731 is smaller in diameter and length than the second spring 732. The first spring 731 has a smaller wire diameter than the second spring 732. The first spring 731 and the second spring 732 are arranged between the piston 71 and the spring containing portion 722 in tandem with a retainer member 74 intervening therebetween.

The hydraulic unit 8 includes a housing 8a. The housing 8a includes a plurality of fluid channels (fluid channels 11 and other channels). The pump 21, the motor 211, and the plurality of electromagnetic valves (cutoff valves 12 and other valves) are fixed to the housing 8a. The fluid channels 11 connect the hydraulic pressure chambers 52 of the master cylinder 5 to the wheel cylinders 2. The fluid channel 11P is branched into a fluid channel 11a and a fluid channel 11d. The fluid channel 11S is branched into a fluid channel 11b and a fluid channel 11c. The cutoff valves 12 are normally-open (open in a non-energized state) electromagnetic proportional valves provided in the fluid channels 11. An electromagnetic proportional valve can be opened at a freely-selected opening degree according to electric current that is supplied to a solenoid. Each of the fluid channels 11 is separated by the corresponding cutoff valve 12 into a fluid channel 11A on the master cylinder 5 side and a fluid channel 11B on the wheel cylinders 2 side.

Solenoid in valves 13 are normally-open electromagnetic proportional valves provided in the fluid channels 11 at positions closer to the wheel cylinders 2 (fluid channels 11a, 11b, 11c and 11d) than the cutoff valves 12 so as to correspond to the wheels FL, FR, RL and RR. The fluid channels 11 are provided with bypass fluid channels 14 bypassing the solenoid in valves 13. The bypass fluid channels 14 are provided with check valves 15 that allow the brake fluid to flow only in a direction from the wheel cylinders 2 side toward the master cylinder 5 side.

A suction pipe 16 connects the reservoir tank 6 and an inner reservoir 17 formed in the housing 8a. A fluid channel 18 connects the inner reservoir 17 and a suction end of the pump 21. A fluid channel 19 connects a discharge end of the pump 21 to a portion of each of the fluid channels 11B which extends between the cutoff valves 12 on one side and the solenoid in valves 13 on the other. The fluid channel 19 is branched into a fluid channel 19P of the P-system and a fluid channel 19S of the S-system. The fluid channels 19P and 19S are connected to the fluid channels 11P and 11S, respectively. The fluid channels 19P and 19S function as communication channels connecting the fluid channels 11P and 11S. Communication valves 20 are normally-closed (closed in a non-energized state) on-off valves provided in the fluid channel 19. An on-off valve is switched between open and closed positions in a binary way according to electric current supplied to a solenoid.

The pump 21 generates hydraulic pressure in the fluid channels 11 using the brake fluid supplied from the reservoir tank 6 to generate wheel cylinder hydraulic pressure. The pump 21 is connected to the wheel cylinders 2a, 2b, 2c and 2d through the fluid channel 19 and the fluid channels 11P and 11S. The pump 21 discharges the brake fluid into the fluid channel 19 to pressurize the wheel cylinders 2.

A fluid channel 22 connects branching points in the fluid channels 19P and 19S on one side and a fluid channel 23 on the other. The fluid channel 22 is provided with a pressure adjusting valve 24. The pressure adjusting valve 24 is a normally-open electromagnetic proportional valve. The fluid channel 23 connects portions of the fluid channels 11B which extend from the solenoid in valves 13 toward the wheel cylinders 2 side to the inner reservoir 17. Solenoid out valves 25 are normally-closed on-off valves provided in the fluid channel 23.

A fluid channel 26 is branched from the fluid channel 11A of the P-system and connected to the positive pressure chamber 711 of the stroke simulator 7. The fluid channel 26 may directly connect the primary hydraulic pressure chamber 52P and the positive pressure chamber 711 without the fluid channel 11P (11A).

The fluid channel 27 connects the back pressure chamber 712 of the stroke simulator 7 and the fluid channel 11P (11A). Specifically, the fluid channel 27 is branched from a portion between the cutoff valve 12P and the solenoid in valves 13 in the fluid channel 11P (11B) and connected to the back pressure chamber 712. A stroke simulator in valve 28 is a normally-closed on-off valve provided in the fluid channel 27. The fluid channel 27 is separated by the stroke simulator in valve 28 into a fluid channel 27A located on the back pressure chamber 712 side and a fluid channel 27B located on the fluid channel 11 side. A bypass fluid channel 29 is provided in parallel with the fluid channel 27 to bypass the stroke simulator in valve 28. The bypass fluid channel 29 connects the fluid channel 27A and the fluid channel 27B. The bypass fluid channel 29 is provided with a check valve 30. The check valve 30 allows the brake fluid to flow from the fluid channel 27A toward the fluid channel 11 (27B) side and restrains a reverse flow of the brake fluid.

A fluid channel 31 connects the back pressure chamber 712 of the stroke simulator 7 and the fluid channel 23. A stroke simulator out valve 32 is a normally-closed on-off valve provided in the fluid channel 31. A bypass fluid channel 33 is provided in parallel with the fluid channel 31 to bypass the stroke simulator out valve 32. A check valve 34 is provided in the bypass fluid channel 33. The check valve 34 allows the brake fluid to flow from the fluid channel 23 side toward the back pressure chamber 712 side and restrains a reverse flow of the brake fluid.

A master cylinder hydraulic pressure sensor 35 is provided in a portion (fluid channel 11A) of the fluid channel 11P which extends between the cutoff valve 12P and the master cylinder 5. The master cylinder hydraulic sensor 35 detects hydraulic pressure (master cylinder hydraulic pressure) at the aforementioned portion of the fluid channel 11P. Wheel cylinder hydraulic pressure sensors (P-system pressure sensor, S-system pressure sensor) 36 are provided in the fluid channels 11 at locations between the cutoff valves 12 on one side and the solenoid in valves 13 on the other. The wheel cylinder hydraulic pressure sensors 36 detect hydraulic pressures (wheel cylinder hydraulic pressures) at the aforementioned locations. A discharge pressure sensor 37 is provided in the fluid channel 19 at a location between the discharge end of the pump 21 and the communication valves 20. The discharge pressure sensor 37 detects hydraulic pressure (pump discharge pressure) at the aforementioned location.

A brake system (fluid channel 11) connecting the hydraulic pressure chambers 52 of the master cylinder 5 to the wheel cylinders 2 with the cutoff valves 12 open comprises a first system. The first system generates the wheel cylinder hydraulic pressures from the master cylinder hydraulic pressure generated by pedal effort. The first system thus enables pedal effort braking (non-boost control). A brake system (fluid channels 19, 22, 23 and the like) including the pump 21 and connecting the reservoir tank 6 to the wheel cylinders 2 with the cutoff valves 12 closed comprises a second system. The second system comprises a so-called brake-by-wire system that generates the wheel cylinder hydraulic pressures from the hydraulic pressure generated by the pump 21. The second system enables boost control and the like as brake-by-wire control. During the brake-by-wire control, the stroke simulator 7 creates an operation reaction force associated with the brake application by the driver.

Figure 2:
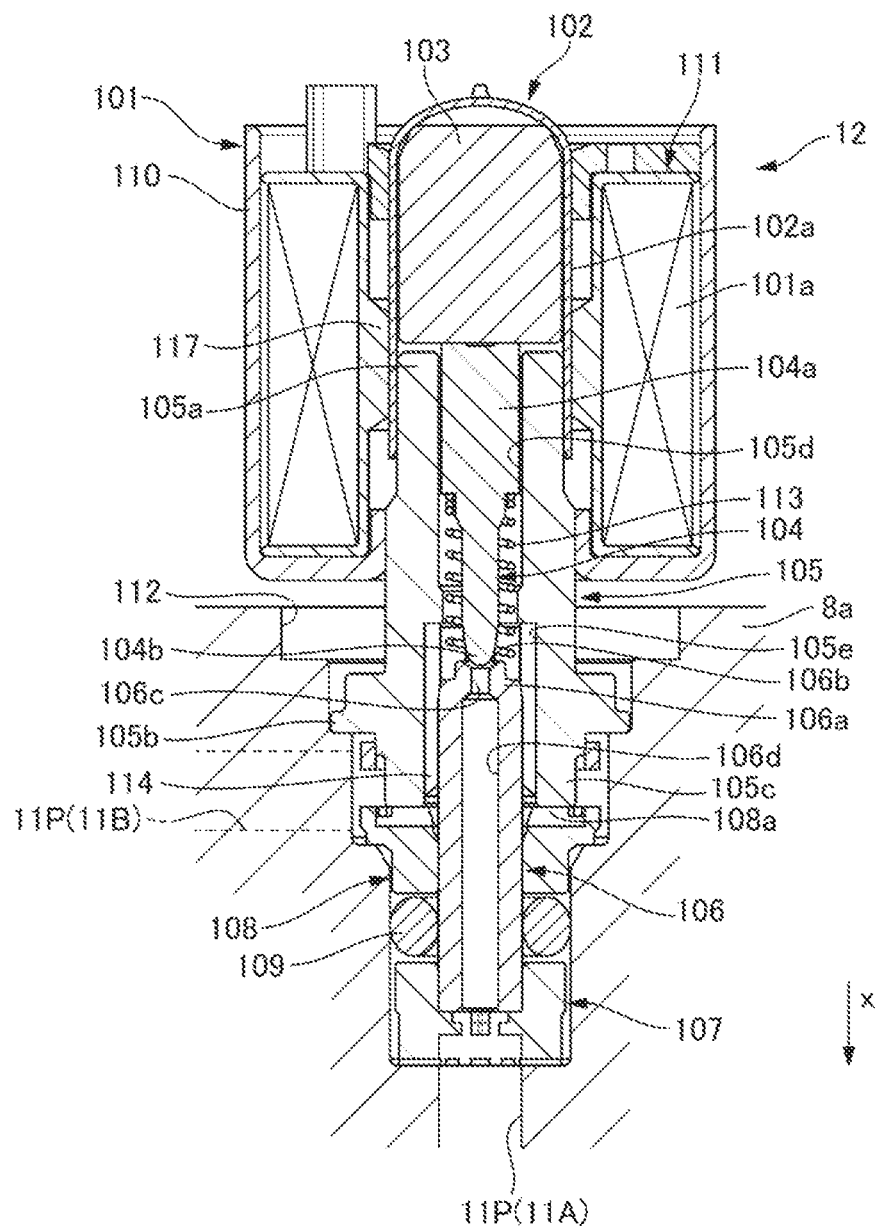
FIG. 2 is an axial sectional view of a cutoff valve 12 according to the Embodiment 1.

FIG. 2 is an axial sectional view of one of the cutoff valves 12 according to the Embodiment 1.

Each of the cutoff valves 12 includes a coil assembly 101, a cylinder (cylindrical member) 102, an armature (movable member) 103, a plunger 104, a valve body 105, a seat member (valve portion) 106, a first filter member 107, a second filter member 108, and a seal member 109. Hereinafter, an X-axis represents an axial direction of the cutoff valves 12, and a direction in which the plunger 104 moves toward the seat member 106 is referred to as an X-axis positive direction.

The coil assembly 101 includes a coil 101a, a yoke 110, and a bobbin 111. The coil 101a is wound around an outer periphery of the bobbin 111. The bobbin 111 is made of resin material and contained in the yoke 110. The yoke 110 is made of magnetic metal, such as iron-based material, and formed in a cylindrical shape. The coil assembly 101 will be discussed later.

The cylinder 102 is made of non-magnetic material and formed in a cylindrical shape. The cylinder 102 is disposed inside the coil assembly 101. The cylinder 102 is open at an X-axis positive direction end and closed at an X-axis negative direction end by a hemispherical bottom portion. The X-axis positive direction end of the cylinder 102 is welded to a first cylindrical portion 105a of the valve body 105.

The armature 103 is made of magnetic material and provided to be movable in the X-axis direction within the cylinder 102. The armature 103 has an X-axis positive direction end that comes into contact with the plunger 104. The armature 103 moves in the X-axis positive direction by an electromagnetic force generated by the coil 101a while the coil 101a is energized.

The plunger 104 is made of non-magnetic material, such as resin, and formed in a rod-like shape. The plunger 104 is disposed along the X-axis direction within the cylinder 102. The plunger 104 has a large diameter portion 104a in an X-axis negative direction side thereof. The large diameter portion 104a is larger in diameter than an X-axis positive direction end of the plunger 104. The X-axis positive direction end of the plunger 104 is a distal end portion 104b formed in a hemispherical shape.

The valve body 105 is made of magnetic material and formed in a cylindrical shape. The valve body 105 includes a first cylindrical portion 105a that is provided in an X-axis negative direction side of the valve body 105 and functions as a magnetic-path forming member, a caulked or staked portion 105b enlarged in diameter which is fixed by caulking or staking to the housing 8a, and a second cylindrical portion 105c that is provided in an X-axis positive direction side of the valve body 105 and inserted in a cutoff valve's housing bore 112. A first housing bore 105d is formed in an inner periphery of the first cylindrical portion 105a. A second housing bore 105e is formed in an inner periphery of the second cylindrical portion 105c. The second housing bore 105e is larger in diameter than the first housing bore 105d.

The seat member 106 is made of non-magnetic material and disposed within the cutoff valve's housing bore 112. The seat member 106 includes a bottom portion 106a at an X-axis negative direction end thereof. The seat member 106 has an X-axis positive direction end that is formed into an open cylinder. A valve seat 106b is provided in a center of an X-axis negative direction end of the bottom portion 106a. A compression coil spring 113 is placed between the bottom portion 106a and the large diameter portion 104a of the plunger 104. The compression coil spring 113 biases the plunger 104 in an X-axis negative direction. The seat member 106 includes a channel 106c and a channel 106d that is larger in diameter than the channel 106c. The channel 106c is formed in a center of the bottom portion 106a and extends in the X-axis direction. The channel 106d is located on an X-axis positive direction side of the channel 106c and communicates with the fluid channel 11P (11A) formed in the housing 8a. A channel 114 is formed between an outer peripheral surface of the seat member 106 and an inner peripheral surface of the second housing bore 105e.

A first filter member 107 is formed by injection-molding resin material. The first filter member 107 is disposed on the X-axis positive direction side of the seat member 106 in the cutoff valve's housing bore 112. The first filter member 107 percolates the brake fluid that flows from the fluid channel 11P (11A) into the channel 106d and prevents contaminants and the like contained in the brake fluid from getting caught in the plunger 104 or the like.

A second filter member 108 is formed by injection-molding resin material. The second filter member 108 is disposed on the X-axis positive direction side of the valve body 105 in the cutoff valve's housing bore 112. The second filter member 108 is provided at an outer side of the valve body 105 and overlaps with the second cylindrical portion 105c in the X-axis direction. The second filter member 108 percolates the brake fluid that flows from the fluid channel 11P (11B) into the channel 114 and prevents contaminants and the like contained in the brake fluid from getting caught in the plunger 104 or the like. The second filter member 108 includes a channel 108a connecting the fluid channel 11P (11B) and the channel 114.

The seal member 109 is an O-ring and disposed between the first filter member 107 and the second filter member 108 in the cutoff valve's housing bore 112. The seal member 109 is mounted on an outer periphery of the seat member 106 and seals a gap between an outer peripheral surface of the seat member 106 and an inner peripheral surface of the cutoff valve's housing bore 112.

Operation of the cutoff valves 12 will be discussed below.

The armature 103 and the plunger 104 are biased in the X-axis negative direction by a biasing force of the compression coil spring 113 while the coil 101a is not energized. The distal end portion 104b of the plunger 104 is therefore separated from the valve seat 106b. The fluid channel 11P (11A) and the fluid channel 11P (11B) are therefore in communication through the channels 106d, 106c, 114 and 108a.

When the coil 101a is energized, a magnetic path is formed in the yoke 110, the armature 103, the first cylindrical portion 105a, which generates an attractive force between the armature 103 and the first cylindrical portion 105a. This attractive force moves the armature 103 and the plunger 104 in the X-axis direction. When the distal end portion 104b of the plunger 104 comes into contact with the valve seat 106b, the fluid channel 11P (11A) and the fluid channel 11P (11B) are cut off from each other. If the attractive force is proportionally controlled by controlling an energization amount of the coil 101a through PWM control, a gap (channel cross-sectional area) between the distal end portion 104b and the valve seat 106b can be controlled, which makes it possible to provide a desired flow rate (hydraulic pressure).

The coil assembly 101 will be now discussed.

Figure 3:
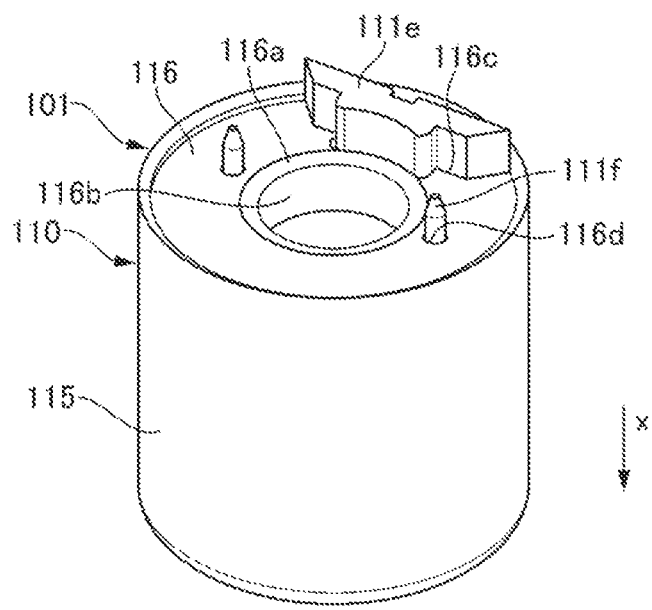
FIG. 3 is a perspective view of a coil assembly 101 according to the Embodiment 1.
Figure 4:
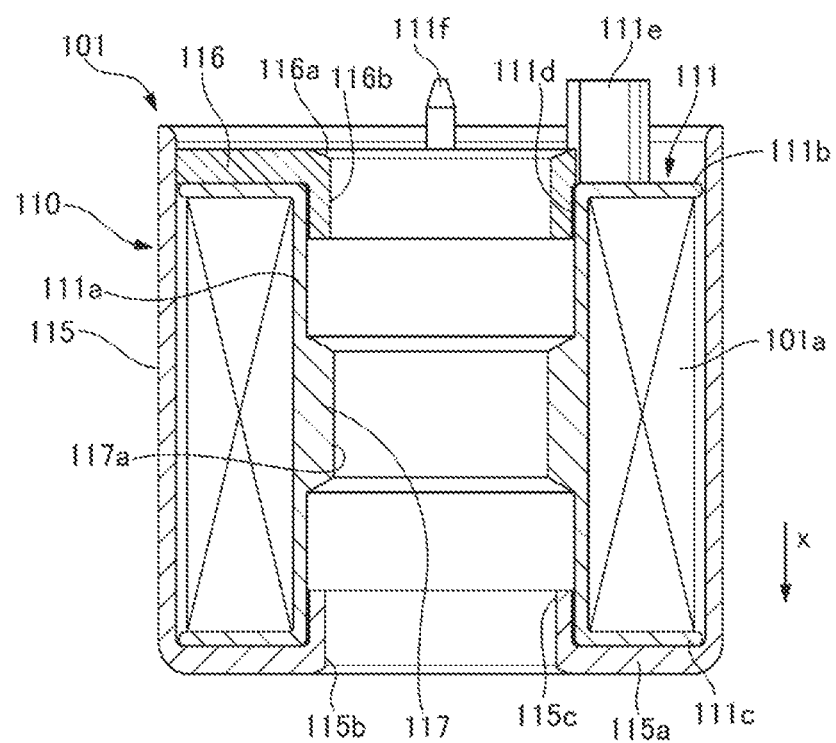
FIG. 4 is a longitudinal sectional view of the coil assembly 101 according to the Embodiment 1.
Figure 5:
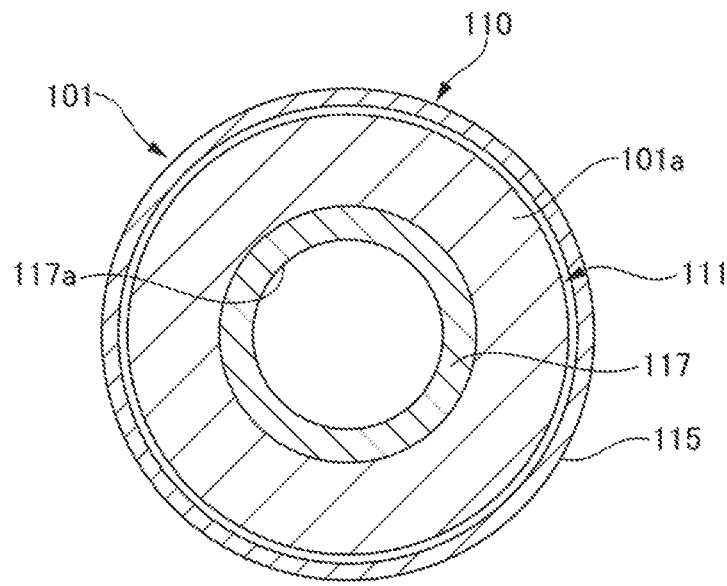
FIG. 5 is a cross-sectional view of the coil assembly 101 according to the Embodiment 1.

FIG. 3 is a perspective view of the coil assembly 101 according to the Embodiment 1. FIG. 4 is a longitudinal sectional view (or a vertical sectional view) of the coil assembly 101. FIG. 5 is a cross-sectional view (or a transverse sectional view) of the coil assembly 101.

The yoke 110 includes a first yoke 115 and a second yoke 116.

The first yoke 115 contains the bobbin 111 inside. The first yoke 115 is formed into a cylinder that includes a bottom portion 115a at an X-axis positive direction end and opens at an X-axis negative direction end. A through-hole 115b is formed in a center of the bottom portion 115a. The valve body 105 extends through the through-hole 115b. The through-hole 115b has an open edge at which a cylindrical portion 115c is formed in a standing manner to extend in the X-axis negative direction.

The second yoke 116 is formed into a disc-like shape along the open end of the first yoke 115. A through-hole 116a is formed in a center of the second yoke 116. The cylinder 102 extends through the through-hole 116a. The through-hole 116a has the same internal diameter as the through-hole 115b. The through-hole 116a has an open edge at which a cylindrical portion 116b is formed in a standing manner to extend in the X-axis positive direction. A cutaway portion 116c and two pin holes 116d are formed in the second yoke 116.

The bobbin 111 includes a shaft portion 111a, a first flange portion 111b, and a second flange portion 111c.

The shaft portion 111a is formed into a cylinder extending in the X-axis direction. A through-hole 111d extends through a center of the shaft portion 111a in the X-axis direction. The cylindrical portion 115c is press-fitted in an X-axis positive direction end of the through-hole 111d, and the cylindrical portion 116b is press-fitted in an X-axis negative direction end of the through-hole 111d.

The first flange portion 111b protrudes from an X-axis negative direction end of the shaft portion 111a in a radially outward direction of the shaft portion 111a. The first flange portion 111b includes a terminal supporting portion 111e and two pins 111f. The terminal supporting portion 111e extends from the first flange portion 111b in the X-axis negative direction through the cutaway portion 116c to protrude beyond the second yoke 116 in the X-axis negative direction. A terminal, not shown, connected to the coil 101a is molded in the terminal supporting portion 111e. The terminal extends in the X-axis negative direction and is soldered to a circuit board of the control unit 9. The pins 111f extend from the first flange portion 111b in the X-axis negative direction through the pin holes 116d to protrude beyond the second yoke 116 in the X-axis negative direction. The pins 111f are inserted in positioning holes formed in a housing of the control unit 9.

The second flange portion 111c protrudes from an X-axis positive direction end of the shaft portion 111a in the radially outward direction of the shaft portion 111a. The first flange portion 111b and the second flange portion 111c have the same external diameter.

Each of the cutoff valves 12 according to the Embodiment 1 is provided with a protruding portion 117 that protrudes inward from an inner peripheral surface of the through-hole 111d of the shaft portion 111a to come into contact with the cylinder 102 in the aim of improving heat dissipation of the coil 101a. The protruding portion 117 is located at an X-axial middle of the shaft portion 111a and provided over the entire periphery of the shaft portion 111a. The protruding portion 117 includes a circular inner peripheral surface 117a. An internal diameter of the inner peripheral surface 117a at the time of molding the bobbin 111 is smaller than an external diameter of an outer peripheral surface 102a of the cylinder 102. During the assembly of the cutoff valve 12, the bobbin 111 is installed in the cylinder 102 by press-fitting. After being press-fitted, the bobbin 111 receives a predetermined retention force from the cylinder 102.

Figure 6:
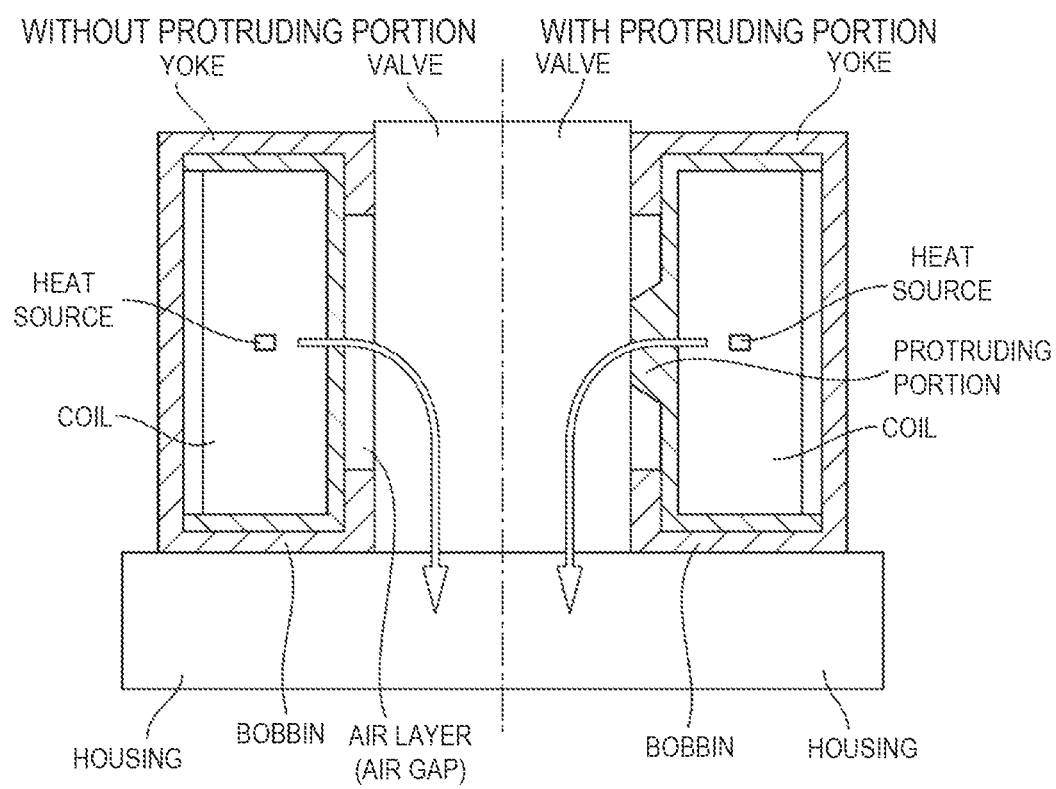
FIG. 6 shows simulation models for carrying out a heat-transfer analysis.
Figure 7:
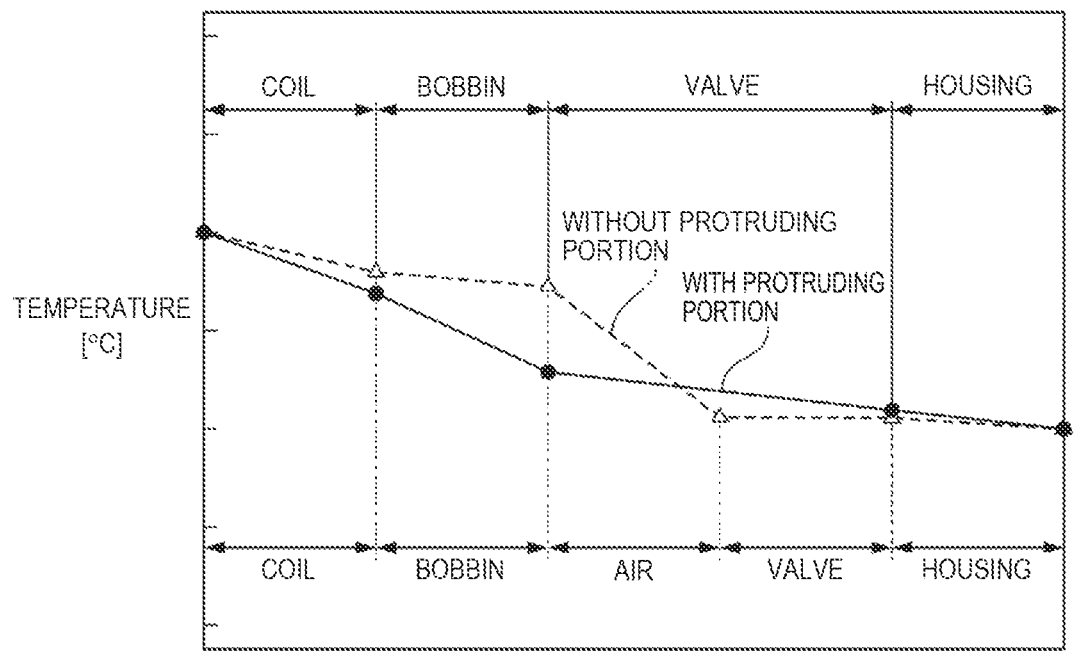
FIG. 7 shows results of the heat-transfer analysis of the simulation models.

FIG. 7 shows results of a heat-transfer analysis carried out using simulation models illustrated in FIG. 6. Referring to FIG. 6, a right side of the figure is a model with a protruding portion, and a left side is a model without a protruding portion. In the simulation, a heat source is disposed in a center of each coil, and temperatures of heat-dissipating paths shown by arrows are measured. A surface temperature of each housing is lower than the corresponding heat source. The heat-dissipating path of the model without a protruding portion extends from the coil through a bobbin, air, and a valve to the housing. The heat-dissipating path of the model with a protruding portion extends from the coil through a bobbin, air, and a valve to the housing. As is apparent from measurement results in FIG. 7, the model with a protruding portion is lower in coil temperature than the model without a protruding portion. In the model without a protruding portion, an air layer (air gap) that is extremely low in heat conductivity (heat transfer rate) lies between the bobbin and the valve. Accordingly, the model without a protruding portion has low performance for heat conduction (heat conductivity or thermal conductivity) from the bobbin to the valve. In other words, the air gap functions as a diaphragm that hampers the heat transfer in the heat dissipating path extending from the coil to the housing. Heat dissipation of the bobbin is then restrained, which deteriorates the heat dissipation of the coil. In the model with a protruding portion, the bobbin is in contact with the valve with the protruding portion intervening therebetween. The model with a protruding portion therefore shows higher performance for heat conduction from the bobbin to the valve, as compared to the model without a protruding portion. Consequently, the model with a protruding portion improves the heat dissipation of the coil more than the model without a protruding portion, that is, conventional electromagnetic valves.

In each of the cutoff valves 12 according to the Embodiment 1, the cylinder 102 is in contact with an inner side of the bobbin 111. This improves the heat conductivity from the bobbin 111 to the cylinder 102 and therefore improves the heat dissipation of the coil 101a, as compared to the conventional electromagnetic valves in which a cylinder is not in contact with an inner side of a bobbin.

An inner periphery of the bobbin 111 is retained in contact with an outer periphery of the cylinder 102. A certain distance is accordingly maintained between the coil 101a on one side and the armature 103 and the valve body 105 on the other. This stabilizes a magnetic force, reducing a repetitive variation of a valve attractive force. It is also possible to ensure coaxiality of the coil assembly 101 with the armature 103 and the valve body 105 and therefore reduce performance fluctuations caused by manufacturing variation of the portions that construct the cutoff valves 12.

The bobbin 111 includes the protruding portion 117 in the inner periphery thereof, which is in contact with the outer periphery of the cylinder 102. This allows a radial gap between the bobbin 111 and the cylinder 102, which has conventionally been dead space, to be efficiently used when the bobbin 111 is brought into contact with the cylinder 102. Since the bobbin 111 is made of resin, it is relatively easy to make a design change from existing products. As for the members other than the bobbin 111, existing products are appropriable, which restrains cost increase.

The protruding portion 117 is provided over the entire circumferential periphery of the bobbin 111. This increases a contact area between the protruding portion 117 and the cylinder 102 and therefore improves the heat conductivity from the bobbin 111 to the cylinder 102.

A part (protruding portion 117) of the inner periphery of the bobbin 111 is in contact with the outer periphery of the cylinder 102. Accordingly, load which is necessary for press-fitting the cylinder 102 into the bobbin 111 is allowed to be smaller, as compared to a configuration in which the entire inner periphery of a bobbin is in contact with the outer periphery of a cylinder. This lessens effects (such as deformation) exerted on the cylinder 102, the armature 103 and the like at the assembly of the cutoff valves 12.

The brake control device 1 comprises the housing 8a and the cutoff valves 12 fixed to the housing 8a. The housing 8a comprises the fluid channels 11. Each of the cutoff valves 12 comprises the bobbin 111 made of resin, the coil 101a wound around the outer periphery of the bobbin 111, the cylinder 102 in contact with the inner side of the bobbin 111, the armature 103 disposed inside the cylinder 102 and moved in a winding axis direction (X-axis direction) of the coil 101a by the energization of the coil 101a, and the seat member 106 that switches between the communication states of the fluid channels 11 in response to the motion of the armature 103. This improves the heat conductivity from the bobbin 111 to the cylinder 102 and thus improves the heat dissipation of the coil 101a, as compared to conventional electromagnetic valves in which a cylinder is not in contact with the inner side of a bobbin.

The fluid channels 11 are the connecting fluid channels that connect the master cylinder 5 to the wheel cylinders 2. The cutoff valves 12 are provided to the respective fluid channels 11. There is the pump 21 that supplies the brake fluid to the portions of the fluid channels 11 which extend from the cutoff valves 12 toward the wheel cylinders 2 side. In the brake control device 1 that is capable of performing the brake-by-wire control, the cutoff valves 12 provided in the fluid channels 11 always act in a valve-closing direction throughout the brake application by the driver. As compared to other electromagnetic valves, the cutoff valves 12 are higher in working pressure and highest in amount of heat generation of the coils 101a. The cutoff valves 12 therefore have a remarkable effect in improving the heat dissipation.

Embodiment 2

An Embodiment 2 is similar in basic configuration to the Embodiment 1. The following discussion refers only to differences from the Embodiment 1.

Figure 8:
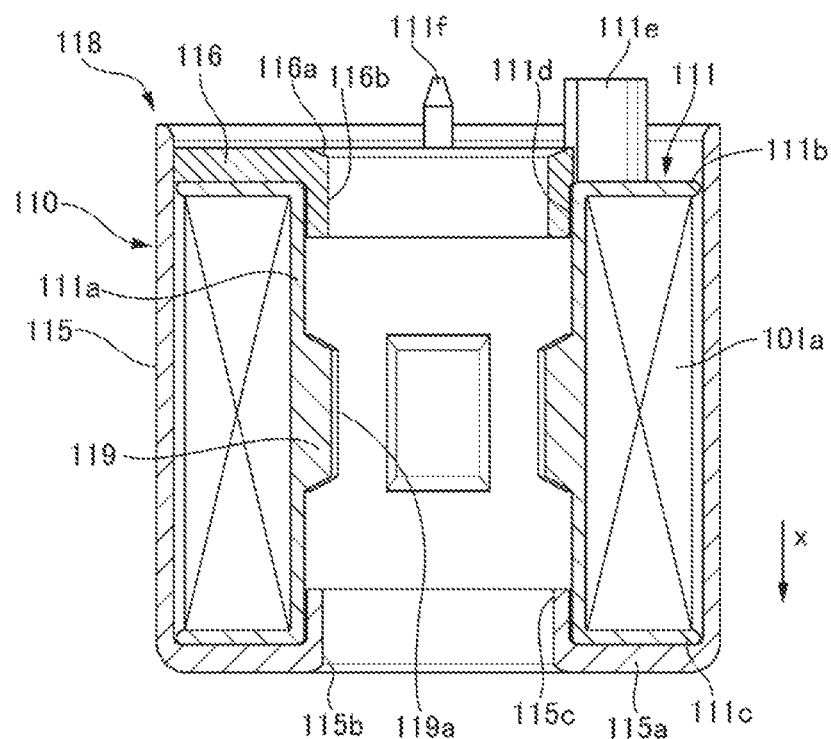
FIG. 8 is a longitudinal sectional view of a coil assembly 118 according to an Embodiment 2.
Figure 9:
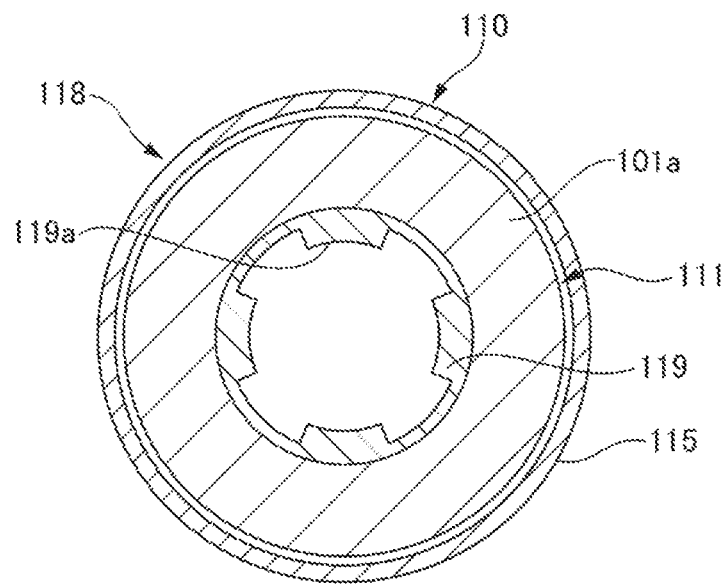
FIG. 9 is a cross-sectional view of the coil assembly 118 according to the Embodiment 2.

FIG. 8 is a longitudinal sectional view of a coil assembly 118 according to the Embodiment 2. FIG. 9 is a cross-sectional view of the coil assembly 118 according to the Embodiment 2.

A protruding portion 119 of the Embodiment 2 differs from the protruding portions of the Embodiment 1 in being provided in part of a bobbin 111 in a circumferential direction. More specifically, the protruding portion 119 comprises four protruding portions 119 provided in the circumferential direction. The protruding portions 119 are circumferentially disposed at a pitch angle of 90 degrees. The protruding portions 119 have inner peripheral surfaces 119a on a circumference, a center of which is a center of a body portion 111a. Each of the inner peripheral surfaces 119a has a circumferential range of 45 degrees.

The Embodiment 2 includes the four protruding portions 119 provided in part of the bobbin 111 in the circumferential direction. Accordingly, load which is necessary for press-fitting a cylinder 102 into the bobbin 111 is allowed to be smaller, as compared to a configuration in which a protruding portion is provided over the entire circumferential periphery of a bobbin. This lessens effects exerted on the cylinder 102, an armature 103 and the like at the assembly of cutoff valves 12.

Embodiment 3

An Embodiment 3 is similar in basic configuration to the Embodiment 2. The following discussion refers only to differences from the Embodiment 2.

Figure 10:
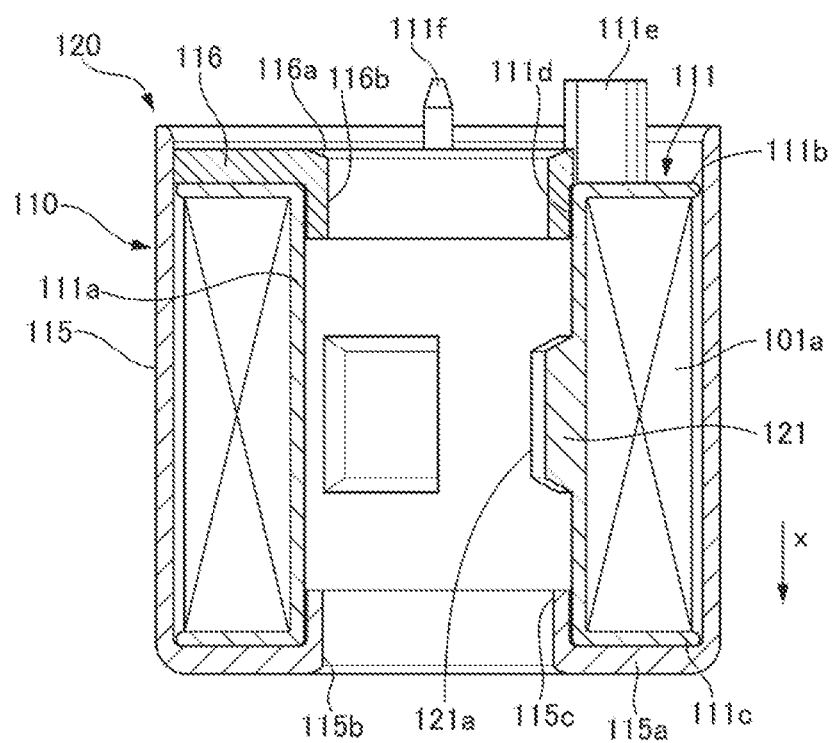
FIG. 10 is a longitudinal sectional view of a coil assembly 120 according to an Embodiment 3.
Figure 11:
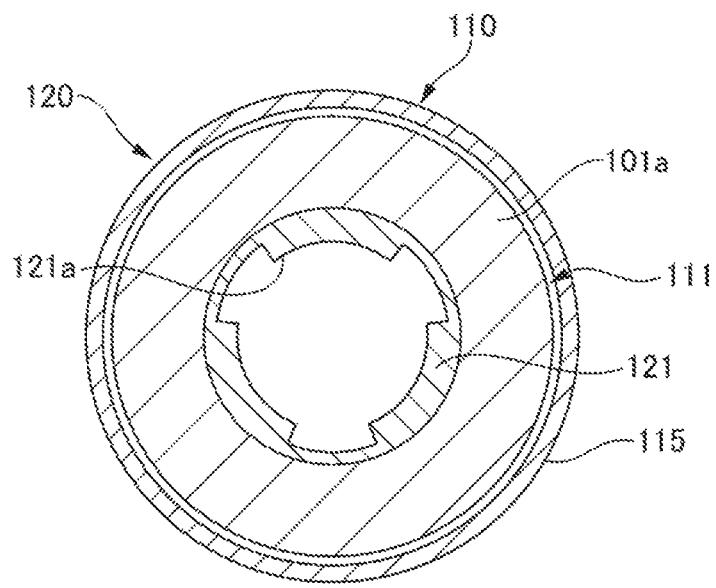
FIG. 11 is a cross-sectional view of the coil assembly 120 according to the Embodiment 3.

FIG. 10 is a longitudinal sectional view of a coil assembly 120 according to the Embodiment 3. FIG. 11 is a cross-sectional view of the coil assembly 120 according to the Embodiment 3.

A protruding portion 121 of the Embodiment 3 differs from the protruding portions of the Embodiment 2 in comprising three protruding portions 121 provided in a bobbin 111 in a circumferential direction. The protruding portions 121 are circumferentially disposed at a pitch angle of 120 degrees. Each of the protruding portions 121 includes an inner peripheral surface 121a having a circumferential range of 60 degrees.

The Embodiment 3 includes the three protruding portions 121 provided in the circumferential direction of the bobbin 111. Accordingly, load which is necessary for press-fitting a cylinder 102 into the bobbin 111 is allowed to be smaller, as compared to a configuration in which four protruding portions are provided in a circumferential direction of a bobbin. This lessens effects exerted on the cylinder 102, an armature 103 and the like at the assembly of cutoff valves 12.

Embodiment 4

An Embodiment 4 is similar in basic configuration to the Embodiment 2. The following discussion refers only to differences from the Embodiment 2.

Figure 12:
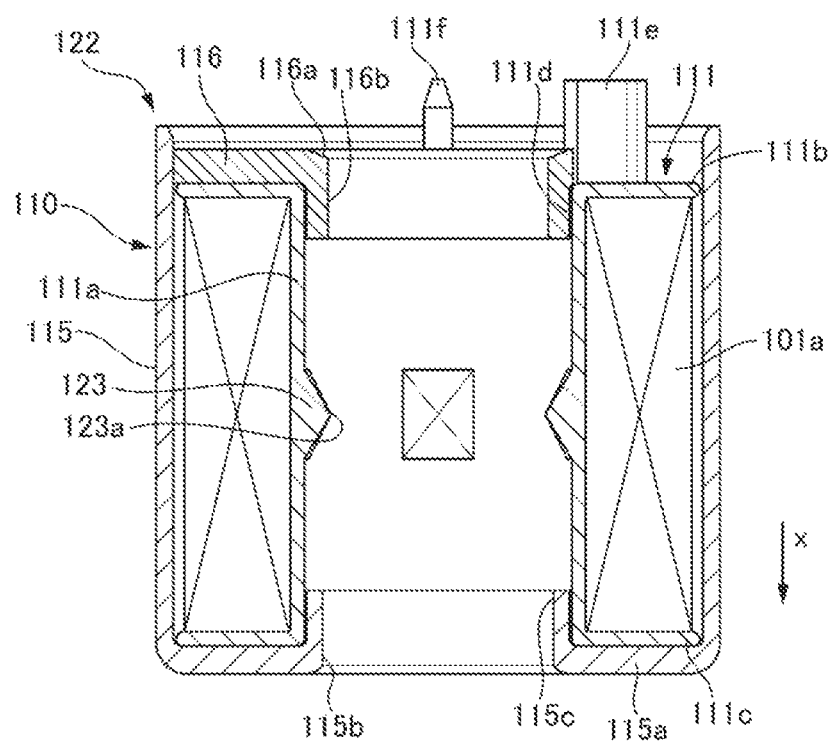
FIG. 12 is a longitudinal sectional view of a coil assembly 122 according to an Embodiment 4.
Figure 13:
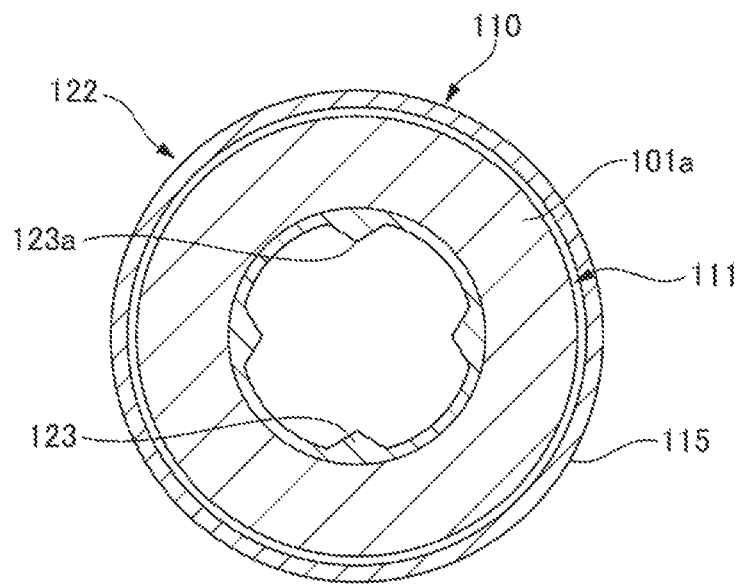
FIG. 13 is a cross-sectional view of the coil assembly 122 according to the Embodiment 4.

FIG. 12 is a longitudinal sectional view of a coil assembly 122 according to the Embodiment 4. FIG. 13 is a cross-sectional view of the coil assembly 122 according to the Embodiment 4.

Protruding portions 123 of the Embodiment 4 differ from the protruding portions of the Embodiment 2 in being gradually reduced in circumferential width from an inner peripheral surface of the bobbin 111 (shaft portion 111a) in a radially inward direction. Each of the protruding portions 123 is formed into an isosceles triangle as viewed in an X-axis direction. Each of the protruding portions 123 is in contact with an outer peripheral surface of a cylinder 102 at an innermost peripheral point (vertex) 123a.

The protruding portions 123 of the Embodiment 4 is gradually reduced in circumferential width inwards from an inner periphery of the bobbin 111. Accordingly, load which is necessary for press-fitting the cylinder 102 into the bobbin 111 is allowed to be smaller, as compared to a configuration in which protruding portions each have a constant circumferential width. This lessens effects exerted on the cylinder 102, an armature 103 and the like at the assembly of cutoff valves 12.

Embodiment 5

An Embodiment 5 is similar in basic configuration to the Embodiment 1. The following discussion refers only to differences from the Embodiment 1.

Figure 14:
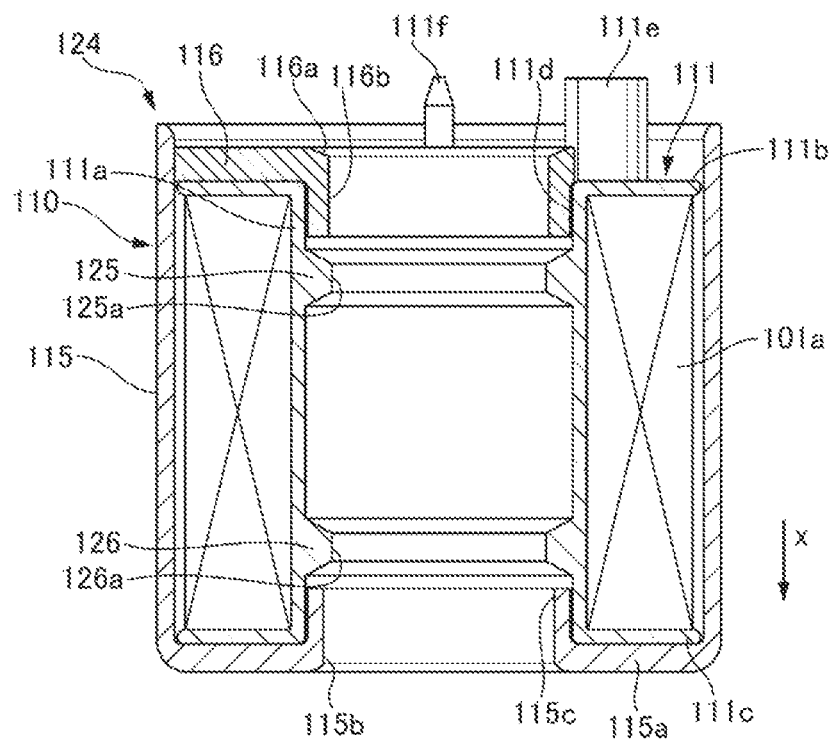
FIG. 14 is a longitudinal sectional view of a coil assembly 124 according to an Embodiment 5.

FIG. 14 is a longitudinal sectional view of a coil assembly 124 according to the Embodiment 5.

The coil assembly 124 of the Embodiment 5 differs from the coil assembly of the Embodiment 1 in having two protruding portions 125 and 126. The protruding portion 125 is disposed on an X-axis negative direction side of an X-axial middle of a shaft portion 111a. The protruding portion 126 is disposed on an X-axis positive direction side of the X-axial middle of the shaft portion 111a. The protruding portions 125 and 126 have the same shape.

In the Embodiment 5, the two protruding portions 125 and 126 are provided in a winding axis direction of a coil 101a. A cylinder 102 and a bobbin 111 come into contact at two locations in the winding axis direction of the coil 101a. The Embodiment 5 more reliably restrains the fall of the coil 101a and thus more firmly stabilizes a magnetic force, as compared to a configuration in which a protruding portion is in contact at one location in the winding axis direction of the coil.

Embodiment 6

An Embodiment 6 is similar in basic configuration to the Embodiment 1. The following discussion refers only to differences from the Embodiment 1.

Figure 15:
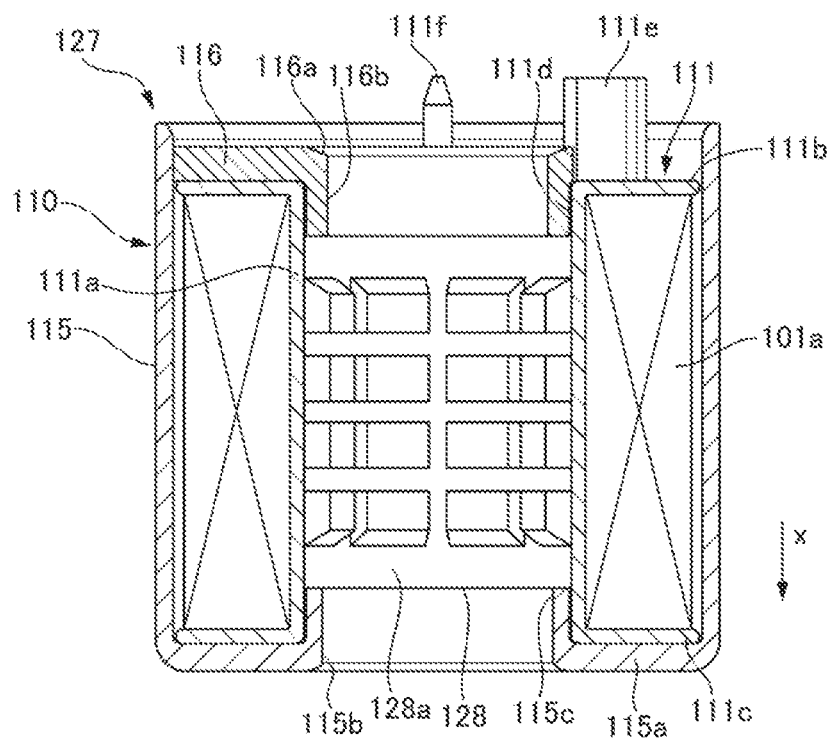
FIG. 15 is a longitudinal sectional view of a coil assembly 127 according to an Embodiment 6.
Figure 16:
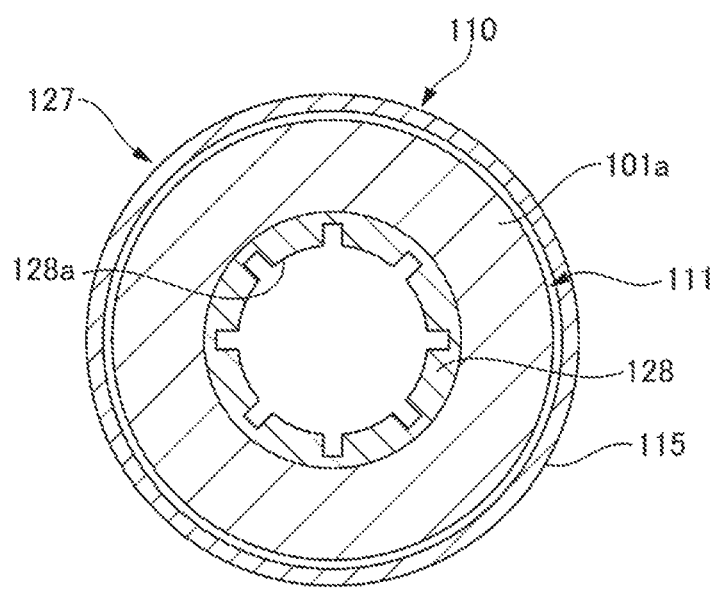
FIG. 16 is a cross-sectional view of the coil assembly 127 according to the Embodiment 6.

FIG. 15 is a longitudinal sectional view of a coil assembly 127 according to the Embodiment 6. FIG. 16 is a cross-sectional view of the coil assembly 127 according to the Embodiment 6.

The Embodiment 6 differs from the Embodiment 1 in that a protruding portion 128 has a grid-like shape. The protruding portion 128 is provided to extend from around an X-axis negative direction end to around an X-axis positive direction end of a shaft portion 111a in an X-axis direction.

The Embodiment 6 includes the grid-like protruding portion 128. A cylinder 102 and a bobbin 111 therefore come into contact at a plurality of locations in a winding direction of a coil 101a. Accordingly, the Embodiment 6 more reliably restrains the fall of the coil 101a and thus more firmly stabilizes a magnetic force, as compared to a configuration in which a protruding portion is in contact at one location in a winding direction of a coil. Moreover, load which is necessary for press-fitting the cylinder 102 into the bobbin 111 is allowed to be smaller, as compared to a configuration in which a protruding portion is provided over the entire circumferential periphery and the entire length of the bobbin 111. This lessens effects exerted on the cylinder 102, the armature 103 and the like at the assembly of cutoff valves 12.

Embodiment 7

An Embodiment 7 is similar in basic configuration to the Embodiment 1. The following discussion refers only to differences from the Embodiment 1.

Figure 17:
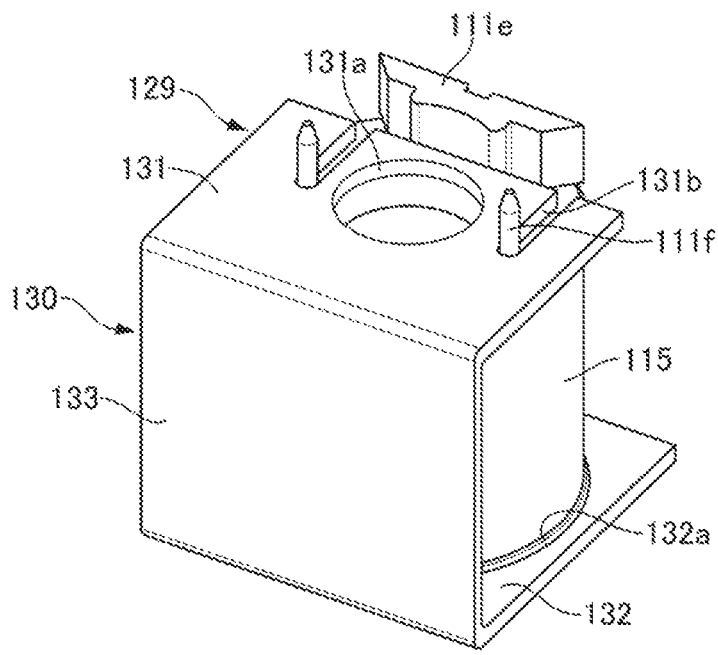
FIG. 17 is a perspective view of a coil assembly 129 according to an Embodiment 7.
Figure 18:
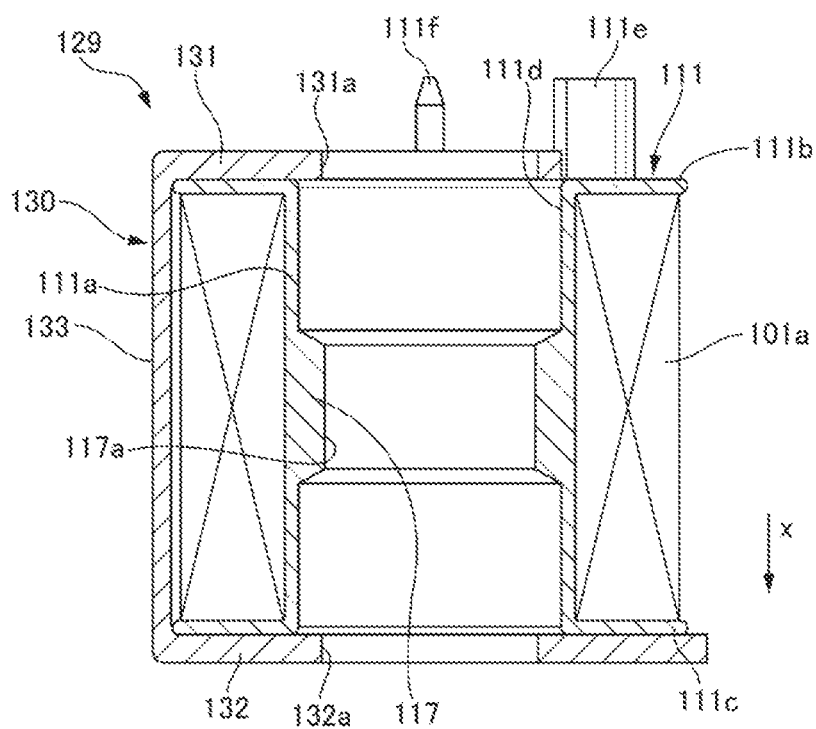
FIG. 18 is a longitudinal sectional view of the coil assembly 129 according to the Embodiment 7.

FIG. 17 is a perspective view of a coil assembly 129 according to the Embodiment 7. FIG. 18 is a longitudinal sectional view of the coil assembly 129 according to the Embodiment 7.

The Embodiment 7 differs from the Embodiment 1 in a shape of a yoke 130. The yoke 130 is formed to have a U-shaped longitudinal section which includes a first bottom portion 131, a second bottom portion 132, and a lateral portion 133. The first bottom portion 131 is located on an X-axis negative direction side of a bobbin 111. The first bottom portion 131 includes a through-hole 131a and two cutaway portions 131b. The through-hole 131a is provided in a center of the first bottom portion 131. A cylinder 102 extends through the through-hole 131a. Pins 111f extend through the respective cutaway portions 131b. The second bottom portion 132 is located on an X-axis positive direction side of the bobbin 111. The second bottom portion 132 includes a through-hole 132a. The through-hole 132a is provided in a center of the second bottom portion 132. A valve body 105 extends through the through-hole 132a. The lateral portion 133 extends in an X-axis direction and connects the first bottom portion 131 and the second bottom portion 132.

The bobbin 111 is similar in external diameter to existing bobbins. This makes the bobbin 111 applicable to yokes in different shapes, such as U-like shapes, as well as cylindrical shapes. U-shaped yokes are easier to manufacture than cylindrical yokes and therefore reduce manufacturing costs.

Embodiment 8

An Embodiment 8 is similar in basic configuration to the Embodiment 7. The following discussion refers only to differences from the Embodiment 7.

Figure 19:
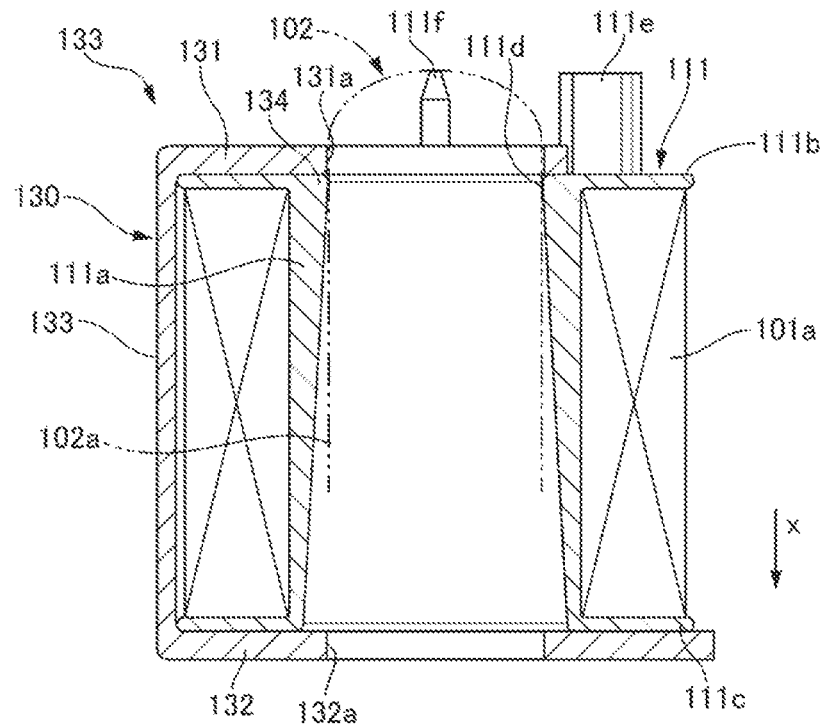
FIG. 19 is a longitudinal sectional view of a coil assembly 133 according to an Embodiment 8.

FIG. 19 is a longitudinal sectional view of a coil assembly 133 according to the Embodiment 8.

The Embodiment 8 differs from the Embodiment 7 in that a through-hole 111d of a shaft portion 111a of a bobbin 111 includes an inner peripheral surface having a tapered shape. The through-hole 111d is so formed that an internal diameter increases from an X-axis negative direction side toward an X-axis positive direction side. An internal diameter of an X-axis negative direction end of the through-hole 111d is smaller than an external diameter of an outer peripheral surface 102a of a cylinder 102. An internal diameter of an X-axis positive direction end of the through-hole 111d is larger than the external diameter of the outer peripheral surface 102a of the cylinder 102. The shaft portion 111a of the bobbin 111 according to the Embodiment 8 includes a portion whose inner peripheral surface is in contact with the cylinder 102. The portion is a protruding portion 134.

According to the Embodiment 8, since the through-hole 111d of the bobbin 111 has a tapered inner periphery, the tapered shape guides the cylinder 102 when the cylinder 102 is press-fitted during assembly and improves assemblability.

Embodiment 9

An Embodiment 9 is similar in basic configuration to the Embodiment 1. The following discussion refers only to differences from the Embodiment 1.

Figure 20:
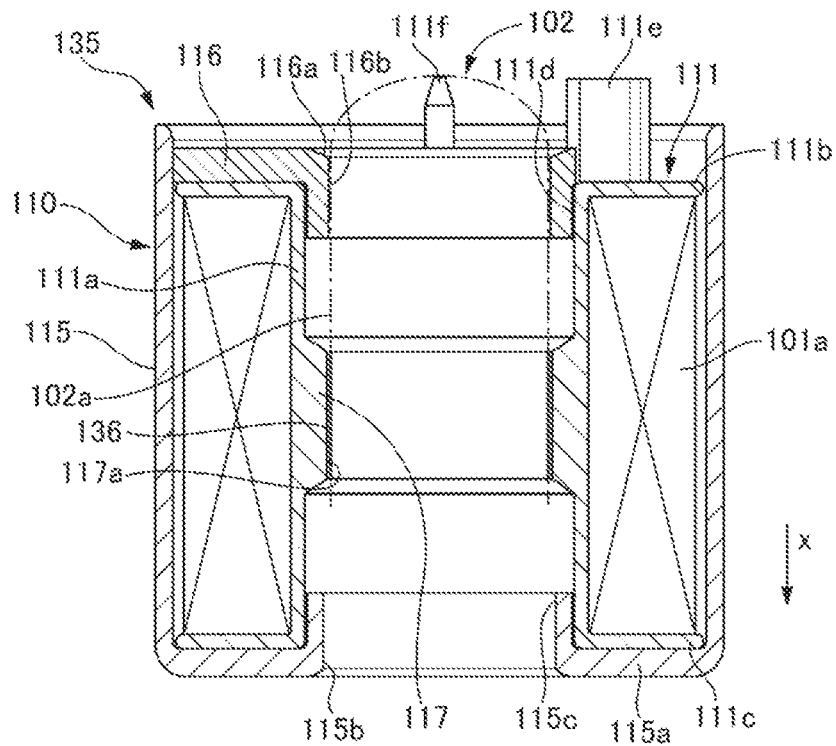
FIG. 20 is a longitudinal sectional view of a coil assembly 135 according to an Embodiment 9.

FIG. 20 is a longitudinal sectional view of a coil assembly 135 according to the Embodiment 9.

The Embodiment 9 differs from the Embodiment 1 in that heat dissipation grease 136 is applied between an inner peripheral surface 117a of a protruding portion 117 and an outer peripheral surface 102a of a cylinder 102. The heat dissipation grease 136 is a heat-transfer member having a higher heat conductivity (heat transfer rate) than air.

In the Embodiment 9, the heat dissipation grease 136 intervenes between a bobbin 111 and the cylinder 102. A microscopic gap between contact areas of the bobbin 11 and the cylinder 102 is filled with the heat dissipation grease 136, and the resistance of heat transfer from the bobbin 111 to the cylinder 102 is reduced smaller, as compared to a configuration without heat dissipation grease. This further improves heat dissipation of a coil 101a.

OTHER EMBODIMENTS

The Embodiments for carrying out the invention have been discussed. Specific configurations of the invention are not limited to the configurations of the Embodiments, and the invention may be modified in design without deviating from the gist thereof.

The invention is applicable to all electromagnetic valves and provides similar operation and advantageous effects to the Embodiments.

The invention may be applied to other electromagnetic valves than the cutoff valves 12 of the brake control device 1 according to the Embodiments.

The heat dissipation grease 136 of the Embodiment 9 may be any heat-transfer member, such as a heat dissipation sheet, which has a higher heat conductivity (heat transfer rate) than air. The protruding portion 117 may be omitted from the bobbin 111 of the Embodiment 9.

The following technical ideas can be understood from the above-discussed embodiments.

An electromagnetic valve according to one mode comprises a bobbin made of resin, a coil wound around an outer periphery of the bobbin, a cylindrical member in contact with an inner side of the bobbin, and a movable member disposed inside the cylindrical member and moved in a winding axis direction of the coil by energization of the coil.

In a more preferred mode according to the above-mentioned mode, the bobbin has an inner periphery that is retained in contact with an outer periphery of the cylindrical member.

In another preferred mode according to either one of the above-mentioned modes, the bobbin includes a protruding portion in the inner periphery, and the protruding portion is in contact with the outer periphery of the cylindrical member.

In still another preferred mode according to any one of the above-mentioned modes, the protruding portion is provided over the entire circumferential periphery of the bobbin.

In still another preferred mode according to any one of the above-mentioned modes, the protruding portion is gradually reduced in circumferential width inwards from the inner periphery of the bobbin.

In still another preferred mode according to any one of the above-mentioned modes, the protruding portion is provided in part of the bobbin in a circumferential direction.

In still another preferred mode according to any one of the above-mentioned modes, the protruding portion comprises four protruding portions provided in the circumferential direction of the bobbin.

In still another preferred mode according to any one of the above-mentioned modes, the protruding portion comprises three protruding portions provided in the circumferential direction of the bobbin.

In still another preferred mode according to any one of the above-mentioned modes, the protruding portion comprises a plurality of protruding portions provided in a winding axis direction of the coil.

In still another preferred mode according to any one of the above-mentioned modes, part of an inner periphery of the bobbin is in contact with an outer periphery of the cylindrical member.

From another aspect, an electromagnetic valve according to a mode comprises a bobbin made of resin, a coil wound around an outer periphery of the bobbin, a cylindrical member disposed inside the bobbin, a heat transfer member disposed between an inner peripheral surface of the bobbin and an outer peripheral surface of the cylindrical member and having a higher heat conductivity (heat transfer rate) than air, and a movable member disposed inside the cylindrical member and moved in a winding axis direction of the coil by energization of the coil.

From another aspect, a brake control device comprises a housing, and an electromagnetic valve fixed to the housing. The housing comprises a fluid channel. The electromagnetic valve comprises a bobbin made of resin, a coil wound around an outer periphery of the bobbin, a cylindrical member in contact with an inner side of the bobbin, a movable member disposed inside the cylindrical member and moved in a winding axis direction of the coil by energization of the coil, and a valve portion configured to switch between communication states of the fluid channel in response to the motion of the movable member.

Preferably, in the above-mentioned mode, the fluid channel is a connecting fluid channel that connects a master cylinder and the braking force imparting portion. The electromagnetic valve is provided in the connecting fluid channel. A hydraulic pressure source is provided, which supplies brake fluid to a portion of the connecting fluid channel which extends from the electromagnetic valve toward the braking force imparting portion side.

The invention is not limited to the foregoing embodiments and may be modified in various ways. In other words, the embodiments have been discussed in detail for easy understanding of the invention, and the invention does not necessarily include all the constitutions mentioned above. A constitution of any one of the embodiments may be partially replaced with a constitution of another embodiment. A constitution of any one of the embodiments may be incorporated into another constitution of another embodiment. Part of a constitution of any one of the embodiments may be incorporated or replaced with another constitution or may be omitted.

The present application claims priority under Japanese Patent Application No. 2018-101653 filed on May 28, 2018. The entire disclosure of Japanese Patent Application No. 2018-101653 filed on May 28, 2018 including the description, claims, drawings and abstract, is incorporated herein by reference in its entirety.

REFERENCE SIGN LIST

1: Brake control device
2: Wheel cylinder (Braking force imparting portion)
5: Master cylinder
8a: Housing
11: Fluid channel (Connecting fluid channel)
12: Cutoff valve (Electromagnetic valve)
21: Pump (Hydraulic pressure source)
101a: Coil
102: Cylinder (Cylindrical member)
103: Armature (Movable member)
106: Seat member (Valve portion)
111: Bobbin
117: Protruding portion
136: Heat dissipation grease (Heat transfer member)

The invention claimed is:

1. An electromagnetic valve comprising:
a bobbin made of resin;
a coil wound around an outer periphery of the bobbin;
a cylindrical member in contact with an inner side of the bobbin, and
a movable member disposed inside the cylindrical member and configured to be moved in a winding axis direction of the coil by energization of the coil, wherein
the bobbin has an inner periphery that is retained in contact with an outer periphery of the cylindrical member,
the bobbin includes a protruding portion in the inner periphery, and the protruding portion is in contact with the outer periphery of the cylindrical member,
the protruding portion is provided in part of the bobbin in a circumferential direction,
the protruding portion is reduced in circumferential width inwards from an inner periphery of the bobbin, and the bobbin is in contact with the movable member with the protruding portion intervening therebetween to increase heat conduction from the bobbin to the movable member.

2. The electromagnetic valve according to claim 1, wherein the protruding portion comprises four protruding portions provided in the circumferential direction of the bobbin.

3. The electromagnetic valve according to claim 1, wherein the protruding portion comprises three protruding portions provided in the circumferential direction of the bobbin.

4. The electromagnetic valve according to claim 1, wherein the protruding portion comprises a plurality of protruding portions provided in a winding axis direction of the coil.

5. A brake control device comprising:
a housing, and an electromagnetic valve fixed to the housing,
the housing comprising a fluid channel,
the electromagnetic valve comprising:
a bobbin made of resin;
a coil wound around an outer periphery of the bobbin;
a cylindrical member in contact with an inner side of the bobbin;
a movable member disposed inside the cylindrical member and moved in a winding axis direction of the coil by energization of the coil, and
a valve portion configured to switch between communication states of the fluid channel in response to the motion of the movable member, wherein
the bobbin has an inner periphery that is retained in contact with an outer periphery of the cylindrical member,
the bobbin includes a protruding portion in the inner periphery, and the protruding portion is in contact with the outer periphery of the cylindrical member,
the protruding portion is provided in part of the bobbin in a circumferential direction,
the protruding portion is reduced in circumferential width inwards from an inner periphery of the bobbin, and
the bobbin is in contact with the movable member with the protruding portion intervening therebetween to increase heat conduction from the bobbin to the movable member.

6. The brake control device according to claim 5, wherein the fluid channel is a connecting fluid channel that connects a master cylinder and the braking force imparting portion;
wherein the electromagnetic valve is provided in the connecting fluid channel; and
wherein a hydraulic pressure source is provided, which supplies brake fluid to a portion of the connecting fluid channel which extends from the electromagnetic valve toward the braking force imparting portion side.

\* \* \* \* \*